United States Patent Office

DAVID W. FOWLER, OF GOSHEN, INDIANA, ASSIGNOR TO HIMSELF, GEORGE A. EWING, AND GEORGE G. KIMBALL, OF SAME PLACE.

Letters Patent No. 75,147; dated March 3, 1868.

IMPROVED ILLUMINATING-OIL.

*The Schedule referred to in these Letters Patent and making part of the same.*

TO ALL WHOM IT MAY CONCERN:

Be it known that I, DAVID W. FOWLER, of Goshen, in the county of Elkhart, and State of Indiana, have invented a new and useful Illuminating-Oil, which I propose to designate "Sun Oil;" and I do hereby declare that the following is a full and exact description of the same.

This invention consists in the union with naphtha, as a base, of certain chemicals, affording a safe, cheap, and brilliant light, the oil to be used in ordinary kerosene-lamps, suitable as well for the mechanic arts, affording an intense heat when used for the blow-pipe.

To enable others skilled in the art to make and use my invention, I will proceed to describe the same.

The ingredients are as follows, and about the proportions stated:

R. Naphtha, one gallon; cupri sulphas, one ounce; zinci oxidum, one ounce; alumina sulphas et potassium, four ounces; potassium chloras, half an ounce; camphora, one drachm; aqua fortis, two ounces.

The following are the chemical symbols, viz.:

$C^{10} H^{12}$; $Zno\, O$; $Cu\, O.\, So^3 + 5\, H.\, O.$; $K.\, O.\, Cl.\, O^5$; $Al^2 O^3 + KOSO^3 + 24\, H.\, O$; $C^{10} H^3 O$; $H.\, O.$

The chemical combination of cupri sulphas and zinci produces a metallic light similar to that of magnesium, and chlorate prevents too rapid combustion. The alumina prevents any explosive results. The camphor precipitates all resinous matter, which gives a clear light, entirely free from smoke.

Having thus fully described my invention, what I claim as new, and desire to secure by Letters Patent, is—

The combination of the above ingredients, in manner and proportions as set forth, and for the purposes specified.

DAVID W. FOWLER. [L. S.]

Witnesses:
JOHN K. MULHOLLAND,
MARTIN STUCKMAN.